United States Patent
Yoshida et al.

(10) Patent No.: US 8,796,984 B2
(45) Date of Patent: Aug. 5, 2014

(54) FUEL CELL SYSTEM, CONTROL METHOD FOR THE FUEL CELL SYSTEM, AND VEHICLE EQUIPPED WITH THE FUEL CELL SYSTEM

(75) Inventors: Michio Yoshida, Miyoshi (JP); Atsushi Imai, Gamagori (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 342 days.

(21) Appl. No.: 13/258,189

(22) PCT Filed: Mar. 18, 2010

(86) PCT No.: PCT/IB2010/000560
§ 371 (c)(1),
(2), (4) Date: Sep. 21, 2011

(87) PCT Pub. No.: WO2010/112997
PCT Pub. Date: Oct. 7, 2010

(65) Prior Publication Data
US 2012/0007545 A1   Jan. 12, 2012

(30) Foreign Application Priority Data
Mar. 31, 2009  (JP) ................................ 2009-085108

(51) Int. Cl.
*H01M 10/46*    (2006.01)
(52) U.S. Cl.
USPC ....................................................... 320/101

(58) Field of Classification Search
USPC .......................... 320/101, 103, 107, 128, 132
See application file for complete search history.

(56) References Cited

U.S. PATENT DOCUMENTS

| | | | |
|---|---|---|---|
| 2008/0087479 A1 | 4/2008 | Kang | |
| 2008/0257621 A1 | 10/2008 | Saeki et al. | |
| 2010/0055521 A1* | 3/2010 | Umayahara et al. | ............ 429/23 |
| 2011/0014536 A1 | 1/2011 | Yoshida et al. | |

FOREIGN PATENT DOCUMENTS

| | | |
|---|---|---|
| DE | 112008000096 T5 | 11/2009 |
| DE | 112009000604 T5 | 1/2012 |
| JP | 2004-288530 A | 10/2004 |
| JP | 2007-026891 A | 2/2007 |
| JP | 2008-218398 A | 9/2008 |
| JP | 2009-059558 A | 3/2009 |

OTHER PUBLICATIONS

International Search Report issued Jun. 25, 2010 in PCT/IB2010/000560 & Written Opinion.

* cited by examiner

*Primary Examiner* — Edward Tso
(74) *Attorney, Agent, or Firm* — Kenyon & Kenyon LLP

(57) ABSTRACT

A fuel cell system includes a fuel cell, a secondary cell, and a control portion that controls the amount of electricity generated when the fuel cell is started. A start-time target voltage is set so as to avoid the overcharged state of the secondary cell. A voltage adjustment portion that adjusts the output voltage of the fuel cell between an open-circuit voltage and a high-potential-avoiding voltage adjusts the amount of electricity generated at the time of starting the fuel cell, on the basis of the start-time target voltage.

8 Claims, 4 Drawing Sheets

CHARGING-POWER RESTRICTION VALUE (kW)

FUEL CELL SYSTEM, CONTROL METHOD FOR THE FUEL CELL SYSTEM, AND VEHICLE EQUIPPED WITH THE FUEL CELL SYSTEM

This is a 371 national phase application of PCT/IB2010/000560 filed 18 Mar. 2010, which claims priority to Japanese Patent Application No. 2009-085108 filed 31 Mar. 2009, the contents of which are incorporated herein by reference.

FIELD OF THE INVENTION

The invention relates to a fuel cell system, a control method for the fuel cell system, and a vehicle equipped with the fuel cell system.

BACKGROUND OF THE INVENTION

Practical application of a fuel cell that supplies hydrogen as a fuel gas to a fuel electrode, and that supplies air as an oxidant gas to an oxidant electrode, and that generates electricity through an electrochemical reaction between hydrogen and oxygen in the air while producing water on an oxidant electrode is now being considered.

In such a fuel cell, if at the time of start of operation, the pressure of hydrogen supplied to the fuel electrode and the pressure of air supplied to the oxidant electrode are about equal to the respective pressures occurring during ordinary operation, it sometimes happens that hydrogen gas and air are unevenly distributed in the fuel electrode and the oxidant electrode, respectively, and the electrodes are degraded by electrochemical reaction caused by the uneven distribution of these gases. Japanese Patent Application Publication No. 2007-26891 (JP-A-2007-26891) discloses a method of preventing the degradation of the electrodes of a fuel cell by causing the pressures of hydrogen and air supplied to the fuel electrode and the oxidant electrode, respectively, at the time of start of operation of the fuel cell to be higher than the ordinary supplied pressures of these gases.

However, if hydrogen gas and air are supplied at high pressure to a fuel cell when the fuel cell starts operation, it sometimes happen that the rate of rise of the voltage of the fuel cell becomes large so that the voltage of the fuel cell overshoots its upper-limit voltage. In conjunction with this problem, Japanese Patent Application Publication No. 2007-26891 (JP-A-2007-26891) discloses a method in which when hydrogen gas and air are supplied, at the time of starting a fuel cell, at pressures that are higher than their pressures given during ordinary power generation, output electric power is extracted from the fuel cell, and is put out to a vehicle driving motor, resistors, etc., provided that the voltage of the fuel cell reaches a predetermined voltage that is lower than the upper-limit voltage.

By the way, in an electric vehicle equipped with a fuel cell, an output power command value for the fuel cell is calculated on the basis of the required electric power of a load, and the output current-voltage characteristic of a fuel cell. However, while the voltage of the fuel cell is rising from the starting voltage at the time of starting the fuel cell, the hydrogen supplied to the fuel cell and the oxygen in the air supplied thereto are consumed for raising the voltage of the fuel cell, electric current does not flow out from the fuel cell. On another hand, in a method in which after the voltage of the fuel cell, at the time of starting the fuel cell, is temporarily raised to an open-circuit voltage (hereinafter, referred to also as "OCV"), a control voltage of the fuel cell is decreased and electric power is extracted from the fuel cell, a control in which the voltage of the fuel cell is set at the OCV so that current does not flow out from the fuel cell is performed until the electricity generation of the fuel cell is permitted. In this case, however, the durability of the fuel cell is sometimes impaired.

Therefore, it is desirable that even before electricity generation of the fuel cell is permitted, the output voltage of the fuel cell be lowered from the OCV in advance in order to avoid the high-potential state. Then, if the fuel cell, at the time of start thereof, generates more electric power than required by the load, the surplus amount of electric power is charged into a secondary cell that is provided in the electric vehicle.

However, the amount of electric power with which the secondary cell is able to be further charged can sometimes be restricted depending on the state of charge of the secondary cell. Besides, the electric power storage capacity of the secondary cell itself also sometimes changes in accordance with changes in the ambient conditions of the secondary cell at the time of charging, for example, in the case of charging in a low-temperature condition (where the ambient temperature is, for example, −30° C. or lower) or in a high-temperature condition (where the temperature of the secondary cell is, for example, 50° C. or higher). Therefore, in some cases, the secondary cell can become overcharged immediately after the fuel cell is started.

SUMMARY OF THE INVENTION

The invention provides a fuel cell system that restrains degradation of a secondary cell by avoiding the overcharge of the secondary cell when the fuel cell system is started, and also provides a control method for the fuel cell system, and a vehicle equipped with the fuel cell system.

A first aspect of the invention relates to a fuel cell system. This fuel cell system includes: a fuel cell that generates electricity through an electrochemical reaction between a fuel gas and an oxidant gas; a secondary cell that is chargeable and dischargeable and that is charged with electric power that is output from the fuel cell; a control portion that controls amount of electricity generated at a time of starting the fuel cell; a voltage adjustment portion that charges the secondary cell with surplus electric power at the time of starting the fuel cell, and that adjusts output voltage of the fuel cell between an open-circuit voltage and a high-potential-avoiding voltage; and a start-time target voltage setting portion that sets a start-time target voltage such that an overcharged state of the secondary cell is avoided. The control portion controls the amount of electricity generated at the time of starting the fuel cell so that the start-time target voltage is reached.

The fuel cell system may further include: a charging-power restriction value calculation portion that calculates a charging-power restriction value Win of the secondary cell; and an SOC calculation portion that calculates state of charge of the secondary cell, and the start-time target voltage setting portion may set the start-time target voltage based on the charging-power restriction value $W_{in}$ and the state of charge.

The fuel cell system may further include: a voltage transformer provided between the secondary cell and a load; and a mover that outputs a predetermined regenerative electric power when braking; a regenerative power restriction voltage calculation portion that calculates a target value $V_3$ of regenerative power restriction voltage for restricting output of the mover according to the charging-power restriction value $W_{in}$, and the start-time target voltage setting portion may set the start-time target voltage based on the charging-power restriction value $W_{in}$, the state of charge, and the target value of the regenerative power restriction voltage.

The fuel cell system may further include: a first target voltage setting portion that computes a first target voltage value $V_1$ based on the charging-power restriction value Win; and a second target voltage setting portion that computes a second target voltage value $V_2$ based on the state of charge, and the start-time target voltage setting portion may set as the start-time target voltage a largest one of the target voltage values $V_1$, $V_2$ and $V_3$.

The fuel cell system may further include: a first target voltage setting portion that computes a first target voltage value based on the charging-power restriction value; a second target voltage setting portion that computes a second target voltage value based on the state of charge, and the start-time target voltage setting portion may set as the start-time target voltage a larger one of the first target voltage value and the second target voltage value.

A second aspect of the invention relates to a vehicle. This vehicle has any one of the foregoing fuel cell systems.

A third aspect of the invention relates to a control method for a fuel cell system. The fuel cell system includes a fuel cell that generates electricity through an electrochemical reaction between a fuel gas and an oxidant gas, and a secondary cell that is chargeable and dischargeable and that is charged with electric power that is output from the fuel cell. The control method for this fuel cell system includes: charging the secondary cell with surplus electric power at a time of starting the fuel cell, and adjusting output voltage of the fuel cell between an open-circuit voltage and a high-potential-avoiding voltage; setting a start-time target voltage such that an overcharged state of the secondary cell is avoided; and controlling the amount of electricity generated at the time of starting the fuel cell so that the start-time target voltage is reached.

According to the invention, it is possible to start the fuel cell system while avoiding the overcharge of the secondary cell.

BRIEF DESCRIPTION OF THE DRAWINGS

The foregoing and further features and advantages of the invention will become apparent from the following description of preferred embodiments with reference to the accompanying drawings, wherein like numerals are used to represent like elements and wherein.

DETAILED DESCRIPTION OF THE EMBODIMENTS

Figure 1:
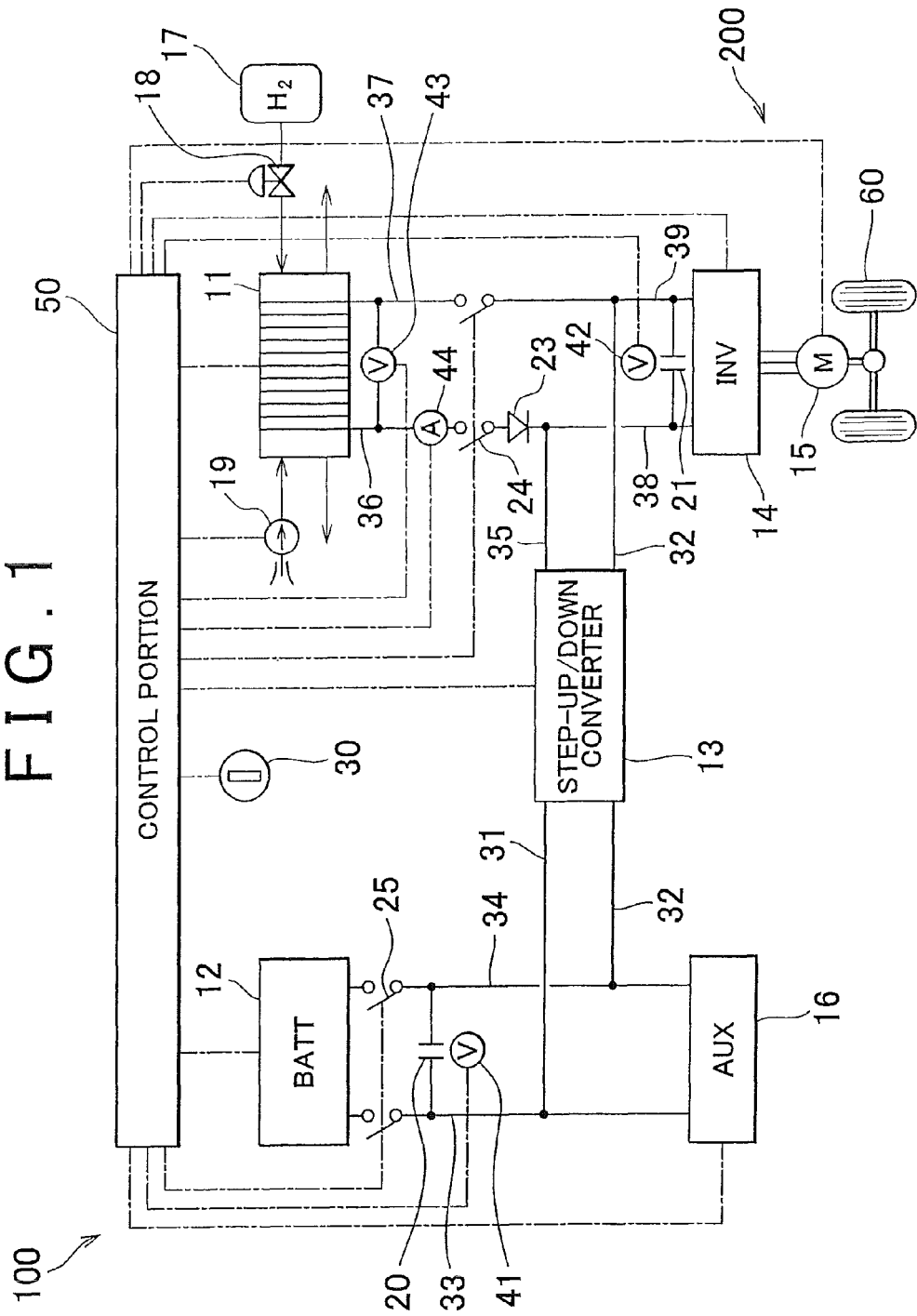
FIG. 1 is a system diagram of a fuel cell system in an embodiment of the invention.

As shown in FIG. 1, a fuel cell system 100 mounted in an electric vehicle 200 includes a chargeable and dischargeable secondary cell 12, a step-up/down voltage converter 13 that raises or lowers the voltage of the secondary cell 12, an inverter 14 that converts direct-current electric power of the step-up/down voltage converter 13 into alternating-current electric power, and supplies the electric power to a traction motor 15, and a fuel cell 11. Incidentally, the term "electric vehicle" in this specification means to include a hybrid electric motor vehicle (hybrid vehicle (HV)) that has a generator that generates electricity due to the regeneration or the driving by an engine, and also has a motor that operates by electric power from a battery and drives driving wheels of the vehicle, a so-called electric motor vehicle (electric vehicle (EV)), and a fuel cell vehicle (fuel cell electric vehicle (FCEV)).

The secondary cell 12 is constructed of a chargeable and dischargeable lithium-ion battery, or the like. The step-up/down voltage converter 13 has a plurality of switching elements, and raises a voltage supplied from the secondary cell 12 to a low voltage or a high voltage for use for driving a traction motor, by on/off-operations of the switching elements. The step-up/down voltage converter 13 is a non-insulated bidirectional DC/DC converter whose reference electrical path 32 is connected to both a minus-side electrical path 34 of the secondary cell 12 and a minus-side electrical path 39 of the inverter 14, and whose primary-side, electrical path 31 is connected to a plus-side electrical path 33 of the secondary cell 12, and whose secondary-side electrical path 35 is connected to a plus-side electrical path 38 of the inverter 14. Besides, the plus-side electrical path 33 and the minus-side electrical path 34 of the secondary cell 12 are each provided with a system relay 25 that turns on and off the connection between the secondary cell 12 and a load system.

The fuel cell 11 is supplied with a hydrogen gas, which is a fuel gas, and with air, which is an oxidant gas, and generates electric power though an electrochemical reaction between the hydrogen gas and the oxygen in the air. In the fuel cell 11, the hydrogen gas is supplied from a high-pressure hydrogen tank 17 to a fuel electrode (anode) via a hydrogen supply valve 18, and the air is supplied to an oxidant electrode (cathode) by an air compressor 19. A plus-side electrical path 36 of the fuel cell 11 is connected to the secondary-side electrical path 35 of the step-up/down voltage converter 13 via an FC relay 24 and a blocking diode 23. A minus-side electrical path 37 of the fuel cell 11 is connected to the reference electrical path 32 of the step-up/down voltage converter 13 via another FC relay 24. The secondary-side electrical path 35 of the step-up/down voltage converter 13 is connected to the plus-side electrical path 38 of the inverter 14, and the reference electrical path 32 of the step-up/down voltage converter 13 is connected to the minus-side electrical path 39 of the inverter 14. The plus-side electrical path 36 and the minus-side electrical path 37 of the fuel cell 11 are connected to the plus-side electrical path 38 and the minus-side electrical path 39, respectively, of the inverter 14, via the FC relays 24. The FC relays 24 turn on and off the connection between the load system and the fuel cell 11. When the FC relays 24 are closed, the fuel cell 11 is connected to the secondary side of the step-up/down voltage converter 13, so that the electric power generated by the fuel cell 11 is supplied together with the secondary-side electric power of the secondary cell 12 obtained by raising the voltage of the primary-side electric power of the secondary cell 12, to the inverter, which thereby drives the traction motor 15 that rotates wheels 60. At this time, the voltage of the fuel cell 11 becomes equal to the output voltage of the step-up/down voltage converter 13 and to the input voltage of the inverter 14. Besides, the drive electric power for the air compressor 19, and accessories 16 of the fuel cell 11, such as a cooling water pump, a hydrogen pump, etc., is basically provided by the voltage that is generated by the fuel cell 11. If the fuel cell 11 cannot generate the required electric power, the secondary cell 12 is used as a complement source.

A primary-side capacitor 20 that smoothes the primary-side voltage is connected between the plus-side electrical path 33 and the minus-side electrical path 34 of the secondary cell 12. The primary-side capacitor 20 is provided with a voltage sensor 41 that detects the voltage between the two ends of the primary-side capacitor 20. Besides, a secondary-side capacitor 21 that smoothes the secondary-side voltage is provided between the plus-side electrical path 38 and the minus-side electrical path 39 of the inverter 14. The secondary-side capacitor 21 is provided with a voltage sensor 42 that detects the voltage between the two ends of the secondary-side capacitor 21. The voltage across the primary-side capacitor 20 is a primary-side voltage $V_L$ that is the input voltage of the step-up/down voltage converter 13, and the voltage across the secondary-side capacitor 21 is a secondary-side voltage $V_H$ that is the output voltage of the step-up/down voltage converter 13. Besides, a voltage sensor 43 that detects the voltage of the fuel cell 11 is provided between the plus-side electrical path 36 and the minus-side electrical path 37 of the fuel cell 11. An electric current sensor 44 that detects the output current from the fuel cell 11 is provided on the plus-side electrical path 36 of the fuel cell 11.

A control portion 50 is a computer that contains a CPU that performs signal processing, and a storage portion that stores programs and control data. The fuel cell 11, the air compressor 19, the hydrogen supply valve 18, the step-up/down voltage converter 13, the inverter 14, the traction motor 15, the accessories 16, the FC relays 24, and the system relays 25 are connected to the control portion 50, and are constructed so as to operate according to commands from the control portion 50. Besides, the secondary cell 12, the voltage sensors 41 to 43, and the electric current sensor 44 are each connected to the control portion 50, and are constructed so that the state of the secondary cell 12, and detection signals of the voltage sensors 41 to 43 and the electrical current sensor 44 are input to the control portion 50. The electric vehicle 200 is provided with an ignition key 30 that is a switch for starting and stopping the fuel cell system 100. The ignition key 30 is connected to the control portion 50, and is constructed so that an on/off-signal of the ignition key 30 is input to the control portion 50.

In the fuel cell system 100 having two kinds of electric power sources as described above, the output electric powers of the two cells 11 and 12 are controlled on the basis of a distribution computation for distributing the electric power needed for driving the traction motor 15 between the output electric power of the secondary cell 12 and the output electric power of the fuel cell 11 during ordinary operation. The electric power distribution computation is performed on the basis of the output current-voltage characteristic of the fuel cell and the output current-voltage characteristic of the secondary cell. However, after the fuel cell 11 is started, it takes a time before the voltage of the fuel cell 11 rises up to the operation voltage and therefore electric power can be produced from the fuel cell 11. Hence, in the electric vehicle 200 equipped with the secondary cell 12 and the fuel cell 11, during the period from when the ignition key 30 is turned on to start up the electric vehicle 200 to when it becomes possible to produce electric power from the fuel cell 11, the electric power distribution computation is not performed but the output electric power command value of the fuel cell 11 is set at zero, and the electric power from the secondary cell 12 is used to drive the electric vehicle 200. Then, when the starting of the fuel cell 11 is completed, the operation shifts to an ordinary operation during which the electric power distribution computation is performed.

On the other hand, if the fuel cell generates more electric power than required by the load before the starting of the fuel cell 11 is completed (i.e., during the starting of the fuel cell 11), the surplus amount of electric power is charged into the secondary cell 12 that is provided in the electric vehicle 200. Usually, the secondary cell 12 has a sufficient charge capacity such that the secondary cell 12 is substantially able to store the electric power that the fuel cell outputs during the starting of the fuel cell. However, there is a possibility of the secondary cell 12 becoming overcharged, for example, in the case where the secondary cell 12 has a low charge capacity, such as the case of a secondary cell 12 that has degraded over time, or in the case where the secondary cell 12 is charged under a condition of high SOC (state of charge) of the secondary cell 12.

Therefore, it is necessary to avoid the overcharge of the secondary cell caused by the output of the fuel cell at the time of starting the fuel cell, before electricity generation of the fuel cell is permitted. In an embodiment of the invention, the control portion 50 shown in FIG. 1 has therein a start-time target voltage setting portion (not shown) that sets a start-time target voltage of the fuel cell 11 such that an overcharged state of the secondary cell is avoided, and a voltage adjustment portion (not shown) for avoiding the overcharged state of the secondary cell 12 by adjusting the voltage of the fuel cell between an open-circuit voltage (OCV) and a high-potential-avoiding voltage when, at the time of starting the fuel cell, surplus electric power is charged into the secondary cell 12 and the output voltage of the fuel cell 11 is lowered from the open-circuit voltage to the high-potential-avoiding voltage. As shown in FIG. 1, the control portion 50 controls the amount of electricity generated at the time of starting the fuel cell so that the voltage of the fuel cell becomes equal to the start-time target voltage that is set by the start-time target voltage setting portion, thereby avoiding the overcharge of the secondary cell 12 caused by the charging thereof with surplus electric power. At this time, it is preferable that the voltage adjustment portion adjust the amount of electricity generated at the time of starting the fuel cell so that the voltage of the fuel cell does not become lower than the target voltage. It is to be noted herein that the "high-potential-avoiding voltage" means a pre-determined operation voltage that is less than the OCV and can be generated by the fuel cell 11, so that durability of the fuel cell 11 will be certainly maintained.

In the embodiment of the invention, the control portion 50 includes a charging-power restriction value calculation portion (not shown) that calculates a charging-power restriction value $W_{in}$ for the secondary cell 12, and a first target voltage setting portion (not shown) that computes a target voltage value $V_1$ based on the charging-power restriction value $W_{in}$. The charging-power restriction value is calculated, for example, by using the following expressions (1) and (2):

$$W_{in}(t)=SW_{in}(t)-K_p\times\{IB(t)-I_{tag1}(t)\}-K_i\times\int\{IB(t)-I_{tag2}(t)\}dt \qquad (1)$$

where: $W_{in}(t)$ represents the charging-power restriction value of the secondary cell at time t; $SW_{in}(t)$ represents a charging-power restriction default value for the secondary cell which is set beforehand; $K_p$ represents a p-term feedback gain; $K_i$ represents an i-term feedback gain; $I_{tag1}(t)$ represents an electric current restriction target value in conjunction with the p-term feedback control; and IB(t) represents the value of electric current of the secondary cell at time t.

$$I_{tag1}(t)=F_p(I_{lim}'(t)), \text{ and } I_{tag2}(t)=F_i(I_{lim}'(t)) \qquad (2)$$

where: $I_{lim}'(t)$ is calculated on the basis of a previously calculated permissible charging current value $I_{lim}(t-1)$ that is previously calculated, or on the basis of a set permissible charging current value $I_{lim}(0)$ exclusively for the initial calculation.

Figure 3:
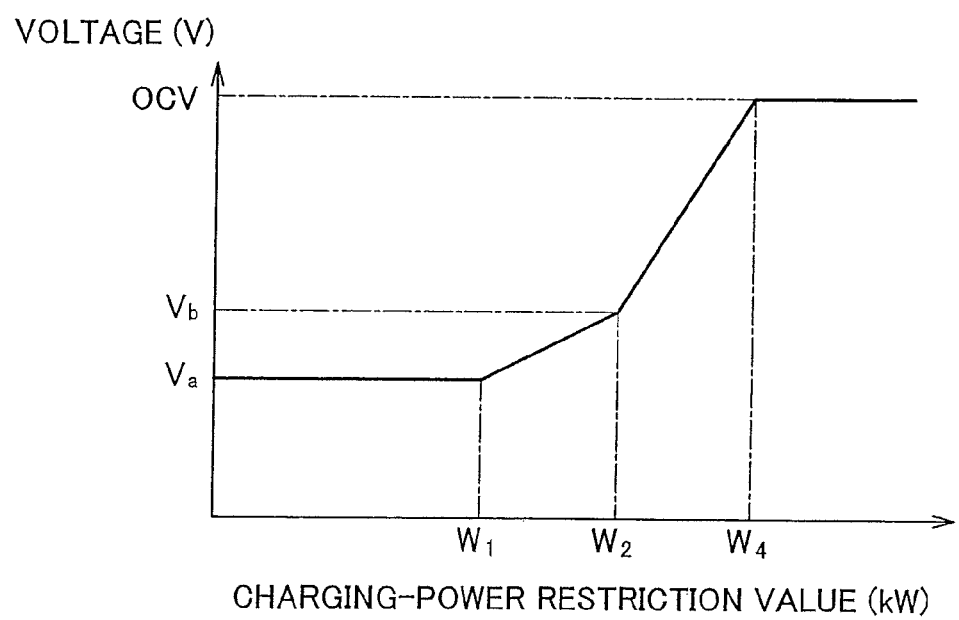
FIG. 3 is a map showing an example of a relation between the charging-power restriction value and a target voltage $V_1$ in the fuel cell system in the embodiment of the invention.

In this embodiment, the first target voltage setting portion is able to calculate the target voltage value $V_1$ on the basis of the charging-power restriction value $W_{in}$ with reference to a data map that is prepared beforehand in a storage portion in the control portion 50, or through a computation based on a predetermined calculation expression. The data map can be acquired beforehand, for example, by an actual equipment test or simulation. FIG. 3 is a data map showing an example of a relation between the charging-power restriction value $W_{in}$ and the target voltage $V_1$ in the fuel cell system in the embodiment of the invention. In FIG. 3, the charging-power restriction value shown along the horizontal axis shows that as the charging-power restriction value increases, the charging-power is restricted to increased extents, and therefore less amount of power can be charged. Therefore, if the charging-power restriction value $W_{in}$ is greater than a predetermined value $W_4$, that is, is on the right side of the value $W_4$, the target voltage $V_1$ is controlled to be at the OCV, so that the charging of the secondary cell 12 is prohibited. Thus, the overcharged state of the secondary cell 12 is avoided. On the other hand, in the case where the charging-power restriction value $W_{in}$ is smaller than a predetermined value $W_1$, that is, is on the left side of the value $W_1$, and where there is no restriction regarding the charging of the secondary cell 12, the target voltage $V_1$ can be decreased to a predetermined value $V_a$ that is the value for the time of ordinary operation.

The control portion 50 also includes an SOC calculation portion (not shown) that calculates the state of charge of the secondary cell 12, and a second target voltage setting portion (not shown) that computes the target voltage value $V_2$ based on the state of charge. The SOC calculation portion receives inputs of signals needed for calculating the state of charge of the secondary cell 12, for example, an inter-terminal voltage from the voltage sensor 41 disposed between the terminals of the secondary cell 12, a charging-discharging capacity from an electric current sensor (not shown) attached to an electric power line that is connected to an output terminal of the secondary cell 12, a cell temperature from a temperature sensor (not shown) attached to the secondary cell 12, etc. Then, the SOC calculation portion calculates the state of charge (SOC) of the secondary cell 12, for example, by integrating the secondary cell electric current value IB(t) that is actually measured by the electric power sensor, or by integrating the estimated electric current value that is corrected by the actually measured voltage and temperature of the secondary cell.

Figure 4:
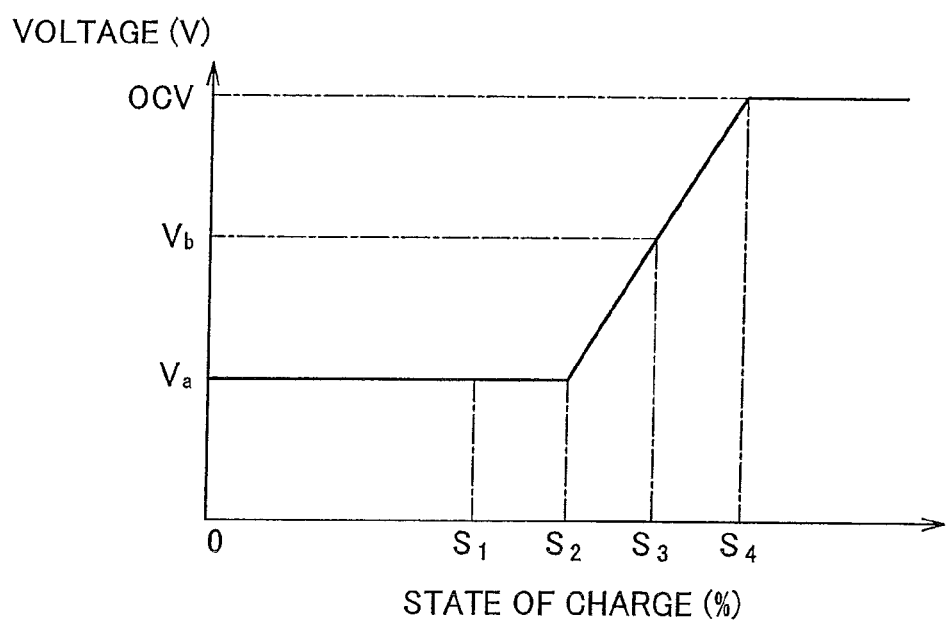
FIG. 4 is a map showing an example of a relation between the SOC of a secondary cell and a target voltage $V_2$ in the fuel cell system in the embodiment of the invention.

In the embodiment, the second target voltage setting portion is able to calculate a target voltage value $V_2$ on the basis of the state of charge with reference to a data map that is prepared beforehand in the storage portion in the control portion 50, or through a computation based on a predetermined calculation expression. The data map can be acquired beforehand, for example, by an actual equipment test or simulation. FIG. 4 is a data map showing an example of a relation between the state of charge and the target voltage $V_2$ of the fuel cell system in the embodiment of the invention. Usually, the state of charge of the secondary cell 12 is designed so that its proper range is a predetermined range of, for example, 40% to 80%, or 60% to 75% depending on embodiments of the invention. In FIG. 4, if the state of charge is greater than a predetermined value $S_4$, the target voltage $V_2$ is controlled to be equal to the OCV, so that the charging of the secondary cell 12 is prohibited. Thus, the overcharged state of the secondary cell 12 is avoided. On the other hand, if the state of charge is less than a predetermined value $S_2$, the target voltage $V_2$ can be decreased to a predetermined value $V_a$ that is the value for the time of ordinary operation.

Furthermore, the control portion 50 shown in FIG. 1 may also be provided with a regenerative power restriction voltage calculation portion (not shown) that calculates a regenerative power restriction voltage $V_3$ for restricting the output of the traction motor 15 that serves as a mover. By controlling the amount of electricity generation of the fuel cell 11 on the basis of the regenerative power restriction voltage $V_3$, it is possible to restrict the maximum regenerative electric power amount that the traction motor 15 can output according to the charging-power restriction value $W_{in}$. Therefore, even in the case where the regenerative electric power amount obtained due to the braking by the traction motor 15 is high, it is possible to restrain temporal troubles regarding the vehicle running characteristics, such as generally-termed torque escape or the like, which are caused by fluctuations of the regenerative torque of the traction motor 15, and also to avoid the overcharge of the secondary cell 12.

Figure 5:
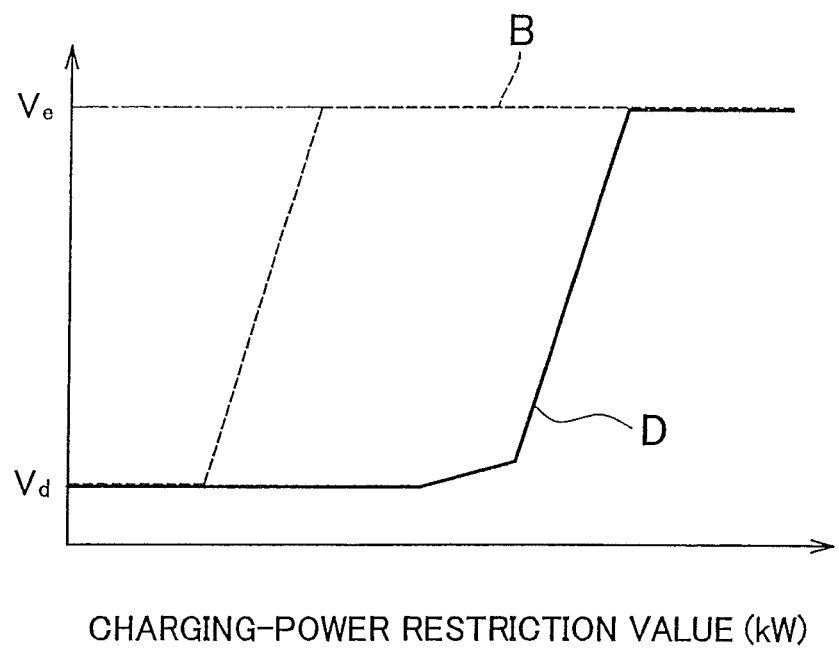
FIG. 5 is a map showing an example of a relation between the charging-power restriction value and a target voltage $V_3$ in each of braking modes in the fuel cell system in the embodiment of the invention.

In the embodiment, the regenerative power restriction voltage calculation portion is able to calculate a target value $V_3$ of the regenerative power restriction voltage on the basis of the charging-power restriction value $W_{in}$ and the braking mode of the traction motor 15, with reference to a data map that is prepared beforehand in the storage portion in the control portion 50, or through a computation based on a predetermined calculation expression. The data map can be acquired beforehand, for example, by an actual equipment test or simulation. FIG. 5 is a data map showing an example of a relation between the charging-power restriction value $W_{in}$ and the target voltage $V_3$ of the fuel cell system in an embodiment of the invention. In FIG. 5, a solid line D shows a braking or driving mode in which the regenerative electric power obtained through braking is relatively small. This braking or driving mode is generally termed the D range. On the other hand, an interrupted line B shows a braking or driving mode generally termed the B range in which the regenerative electric power obtained through braking is larger in amount than in the D range. Since the D range and the B range have different maximum values of the regenerative electric power amount that can be obtained, different data maps are used according to the braking mode of the traction motor 15 to calculate the target voltage value $V_3$ according to the charging-power restriction value $W_{in}$.

In the embodiment, the charging-power restriction value $W_{in}$ represented by the horizontal line in FIG. 3 and FIG. 5 may be corrected beforehand by a value that is less than the secondary cell maximum charging-power by a marginal electric power amount. The marginal electric power amount may be appropriately set, for example, at about several kilowatts, according to, for example, the rate of control of the operation voltage of the fuel cell 11. The charging-power restriction value $W_{in}$ represented by the horizontal line in FIG. 5 can also be corrected by taking into account the electric power consumed in a system that includes the accessories 16.

A target voltage setting portion provided in the control portion 50 shown in FIG. 1 calculates a start-time target voltage $V_{boot}$ of the fuel cell 11 on the basis of the target voltage values $V_1$, $V_2$ and $V_3$ that are obtained as described above. Usually, the target voltage $V_{boot}$ can be set in accordance with the largest value among the target voltage values $V_1$, $V_2$ and $V_3$. Incidentally, in the case where the consideration regarding fluctuations in the regenerative torque is not needed, the consideration of the target voltage value $V_3$ is not needed, and the target voltage $V_{boot}$ can be set in accordance with the larger one of the target voltage values $V_1$ and $V_2$.

An operation of the fuel cell system 100 constructed as described above will be described with reference to FIG. 1 and FIG. 2.

Firstly, the system 100 checks whether or not the ignition key 30 has been turned on (S110). If the ignition key 30 is on, the system 100 calculates the charging-power restriction value $W_{in}(t)$ at time t of input (S112) by the charging-power restriction value calculation portion, and calculates the first target voltage value $V_1$ at time t on the basis of the $W_{in}(t)$ (S114) by the first target voltage setting portion. On the other hand, the SOC calculation portion calculates the state of charge SOC (t) at inputted time t (S116), and the second target voltage setting portion computes the second target voltage value $V_2$ at time t on the basis of SOC(t) (S118).

Next, the system 100 acquires the braking mode of the traction motor 15 (S120), and calculates the target value $V_3$ of the regenerative power restriction voltage at inputted time t (S122) on the basis of $W_{in}(t)$ and the baking mode, by the regenerative power restriction voltage calculation portion.

Next, the start-time target voltage setting portion compares the target values $V_1$, $V_2$ and $V_3$, and selects the largest one of the three values, and accordingly sets the start-time target voltage $V_{boot}$ at time t (S124). Then, the voltage adjustment portion controls the amount of electricity generation of the fuel cell 11 by adjusting the operation voltage of the fuel cell 11 between the open-circuit voltage and the high-potential-avoiding voltage, on the basis of the foregoing start-time target voltage $V_{boot}$, during a period from the connection of the FC relays 24 of the fuel cell to the permission of electricity generation of the fuel cell (S126).

Figure 2:
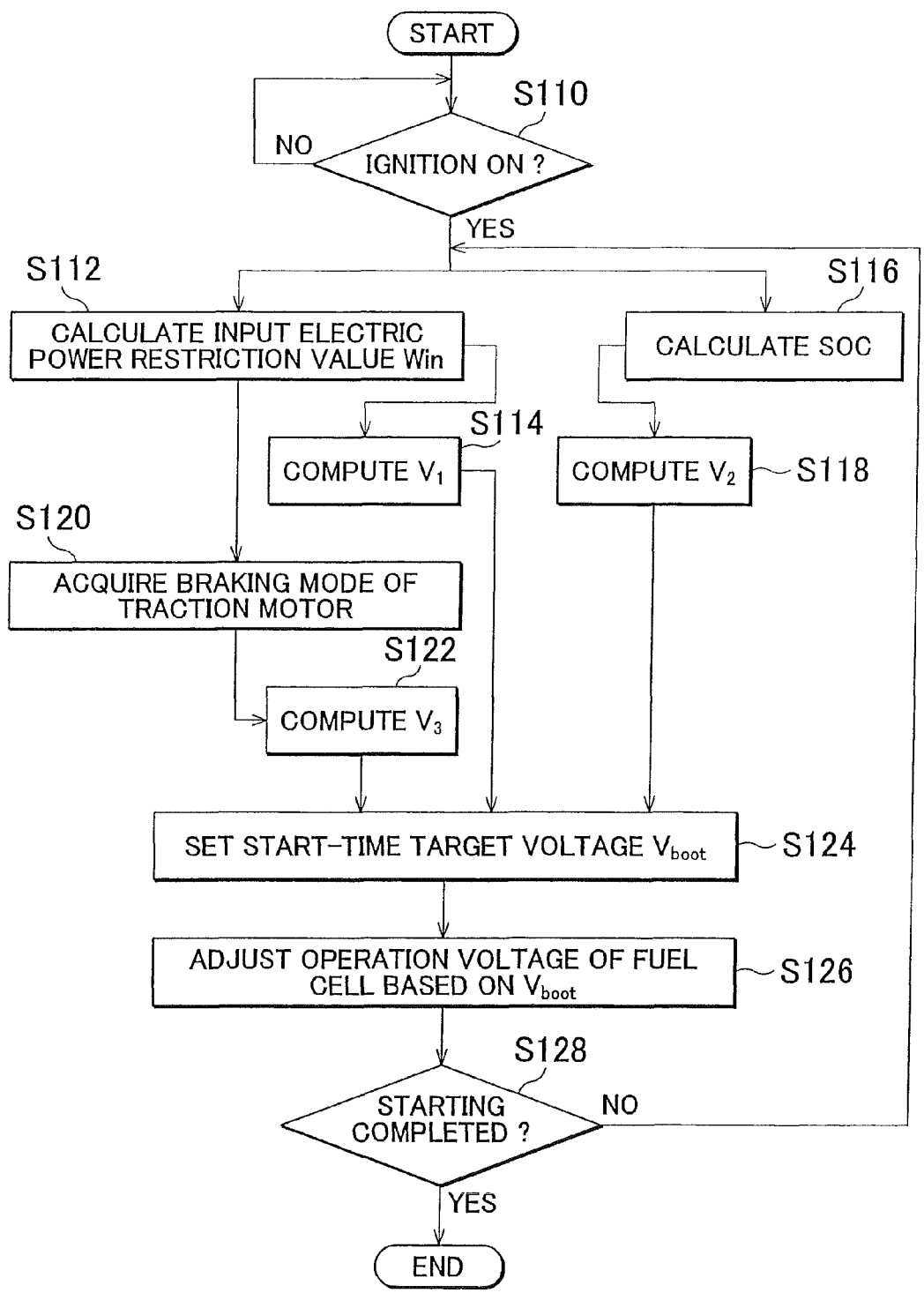
FIG. 2 is a flowchart illustrating a target voltage setting control that is performed on a fuel cell at the time of start thereof in the fuel cell system in the embodiment of the invention.

At the time point when the operation voltage of the fuel cell 11 reaches the start-time target voltage $V_{boot}$, the system 100 determines whether or not the starting of the fuel cell has been completed (S128). The operation shown in FIG. 2 is repeatedly performed until the starting of the fuel cell 11 is completed. At the time of starting the fuel cell 11, the amount of electricity generation of the fuel cell 11 is adjusted while the braking mode of the traction motor 15 is monitored according to the state of charge of the secondary cell 12, and also according to the need. Therefore, the overcharged state of the secondary cell 12 is avoided, and the regenerative torque of the traction motor 15 is secured as well.

The invention is applicable to various fuel cell systems, and is applicable to, for example, fuel cell systems that can be mounted in vehicles, etc.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A fuel cell system comprising:
a fuel cell that generates electricity through an electrochemical reaction between a fuel gas and an oxidant gas;
a secondary cell that is chargeable and dischargeable and that is charged with electric power that is output from the fuel cell;
a control portion that controls amount of electricity generated at a time of starting the fuel cell;
a voltage adjustment portion that charges the secondary cell with surplus electric power at the time of starting the fuel cell, and that adjusts output voltage of the fuel cell between an open-circuit voltage and a high-potential-avoiding voltage; and
a start-time target voltage setting portion that sets a start-time target voltage before the fuel cell starts generating electricity such that an overcharged state of the secondary cell is avoided, wherein
the control portion controls the amount of electricity generated at the time of starting the fuel cell so that the start-time target voltage is reached.

2. The fuel cell system according to claim 1, further comprising:
a charging-power restriction value calculation portion that calculates a charging-power restriction value of the secondary cell; and
an SOC calculation portion that calculates state of charge of the secondary cell, wherein
the start-time target voltage setting portion sets the start-time target voltage based on the charging-power restriction value and the state of charge.

3. The fuel cell system according to claim 2, further comprising:
a voltage transformer provided between the secondary cell and a load; and
a mover that outputs a predetermined regenerative electric power when braking;
a regenerative power restriction voltage calculation portion that calculates a target value of regenerative power restriction voltage for restricting output of the mover according to the charging-power restriction value, wherein the start-time target voltage setting portion sets the start-time target voltage based on the charging-power restriction value, the state of charge, and the target value of the regenerative power restriction voltage.

4. The fuel cell system according to claim 3, further comprising:
a first target voltage setting portion that computes a first target voltage value based on the charging-power restriction value; and
a second target voltage setting portion that computes a second target voltage value based on the state of charge, wherein
the start-time target voltage setting portion sets as the start-time target voltage a largest value of the target value of the regenerative power restriction voltage, the first target voltage value, and the second target voltage value.

5. The fuel cell system according to claim 2, further comprising:
a first target voltage setting portion that computes a first target voltage value based on the charging-power restriction value;
a second target voltage setting portion that computes a second target voltage value based on the state of charge, wherein the start-time target voltage setting portion sets as the start-time target voltage a larger one of the first target voltage value and the second target voltage value.

6. A fuel cell system comprising:
a fuel cell that generates electricity through an electrochemical reaction between a fuel gas and an oxidant gas;
a secondary cell that is chargeable and dischargeable and that is charged with electric power that is output from the fuel cell;
a voltage adjustment portion that charges the secondary cell with surplus electric power at a time of starting the fuel cell, and that adjusts output voltage of the fuel cell between an open-circuit voltage and a high-potential-avoiding voltage;

start-time target voltage setting means for setting a start-time target voltage before the fuel cell starts generating electricity such that an overcharged state of the secondary cell is avoided; and a control portion controls the amount of electricity generated at the time of starting the fuel cell so that the start-time target voltage is reached.

7. A vehicle having a fuel cell system comprising:

a fuel cell that generates electricity through an electrochemical reaction between a fuel gas and an oxidant gas;

a secondary cell that is chargeable and dischargeable and that is charged with electric power that is output from the fuel cell;

a control portion that controls amount of electricity generated at a time of starting the fuel cell;

a voltage adjustment portion that charges the secondary cell with surplus electric power at the time of starting the fuel cell, and that adjusts output voltage of the fuel cell between an open-circuit voltage and a high-potential-avoiding voltage; and a start-time target voltage setting portion that sets a start-time target voltage before the fuel cell starts generating electricity such that an overcharged state of the secondary cell is avoided, wherein the control portion controls the amount of electricity generated at the time of starting the fuel cell so that the start-time target voltage is reached.

8. A control method for a fuel cell system that includes a fuel cell that generates electricity through an electrochemical reaction between a fuel gas and an oxidant gas, and a secondary cell that is chargeable and dischargeable and that is charged with electric power that is output from the fuel cell, the control method comprising:

charging the secondary cell with surplus electric power at a time of starting the fuel cell, and adjusting output voltage of the fuel cell between an open-circuit voltage and a high-potential-avoiding voltage;

setting a start-time target voltage before the fuel cell starts generating electricity such that an overcharged state of the secondary cell is avoided; and controlling the amount of electricity generated at the time of starting the fuel cell so that the start-time target voltage is reached.

\* \* \* \* \*